(12) United States Patent
Pellegrino

(10) Patent No.: US 6,867,704 B2
(45) Date of Patent: Mar. 15, 2005

(54) BI-COLOR LIGHT SOURCE FOR INDICATING STATUS OF INFORMATION HANDLING SYSTEM

(75) Inventor: Thierry Pellegrino, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 187 days.

(21) Appl. No.: 10/377,049

(22) Filed: Feb. 28, 2003

(65) Prior Publication Data

US 2004/0170016 A1 Sep. 2, 2004

(51) Int. Cl.[7] .............................. G08B 5/22; G09F 9/23
(52) U.S. Cl. .......................... 340/815.45; 340/815.65; 362/555; 362/583
(58) Field of Search ........................ 340/815.45, 815.4, 340/815.47, 815.65, 815.66, 815.67, 525; 345/46, 82, 83, 84; 362/555, 583, 559

(56) References Cited

U.S. PATENT DOCUMENTS

| | | | |
|---|---|---|---|
| D360,411 S | 7/1995 | Sharp et al. ................ D14/115 |
| 5,519,832 A | 5/1996 | Warchol ................ 395/183.22 |
| 5,880,955 A | 3/1999 | Matoba et al. .............. 364/188 |
| D411,178 S | 6/1999 | Ikenaga ...................... D14/100 |
| D412,497 S | 8/1999 | Lai ............................ D14/115 |
| 5,954,827 A | 9/1999 | Frank et al. ................... 714/48 |
| D416,009 S | 11/1999 | Lai ............................ D14/115 |
| 5,995,012 A | 11/1999 | Lee et al. .............. 340/815.45 |
| D431,243 S | 9/2000 | Oba ........................... D14/351 |
| D432,134 S | 10/2000 | Leman ....................... D14/441 |
| D435,559 S | 12/2000 | Tanaka ....................... D14/444 |
| D436,952 S | 1/2001 | Goto .......................... D14/349 |
| D436,953 S | 1/2001 | Matsuoka ................... D14/349 |
| D437,325 S | 2/2001 | Searby et al. .............. D14/445 |
| D440,572 S | 4/2001 | Jean et al. .................. D14/445 |
| 6,259,598 B1 * | 7/2001 | Beaman et al. ............. 361/683 |
| 6,597,566 B1 * | 7/2003 | Phan .......................... 361/683 |
| 2002/0190868 A1 | 12/2002 | Dearborn et al. ........ 340/691.1 |

* cited by examiner

Primary Examiner—Toan N. Pham
(74) Attorney, Agent, or Firm—Baker Botts L.L.P.

(57) ABSTRACT

Use of a bi-color light source, a single light conduit and two color filters visually produce two status indications in an information handling system. The bi-color light source produces a blue color light when in a first state and an amber color light when in a second state. The blue color light passes through one of the color filters to a first portion of a single status indicator and the amber color light passes through the other color filter to a second portion of the single status indicator.

27 Claims, 4 Drawing Sheets

US 6,867,704 B2

BI-COLOR LIGHT SOURCE FOR INDICATING STATUS OF INFORMATION HANDLING SYSTEM

RELATED APPLICATION

This application is related to commonly owned U.S. patent application Ser. No. 09/876,594, entitled System and Method for Displaying Computer System Status Information, by Dearborn et al., filed Jun. 7, 2001, and is hereby incorporated by reference herein.

BACKGROUND OF THE INVENTION TECHNOLOGY

1. Field of the Invention

The present invention is related to information handling systems, and more specifically, to visual indication of status and fault conditions in the information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system may be, for example, a data center, also referred to as a server farm. The data center typically includes a group of networked servers. The networked servers are housed together in a single location. The data center expedites computer network processing by combining the power of multiple servers and allows for load balancing by distributing the workload among these servers. More companies and other organizations are using data centers because of the efficiency of these centers in handling vast numbers of storage, retrieval and data processing transactions. Depending on the nature and size of the operation, a data center may have thousands of servers. Typically, these servers are rack-mounted in cabinets. Each cabinet may hold a number of these servers. These cabinets are generally organized into banks or aisles. Accordingly, a large data center may have several banks of cabinets that each contain a plurality of rack-mounted servers. All of these servers within the data center are typically monitored via a single console by one or two individuals who serve as network administrators.

Conventional data centers typically use server management software to monitor server components and alert system monitors in the event of a component failure. For example, if one of the hard drives of a server fails, then the server management software will send an alert message to the system monitor's console. The network monitor will respond to the alert message and rectify the failure. Because data centers are often implemented in mission critical operations that demand continuous and reliable operation, the servers of these data centers must operate continuously with very few failures. In the event of a server failure, the problem must be solved immediately. In this sort of environment, any down time is unacceptable. For example, if the data center of a financial firm goes down, a minute of down time can result in thousands of dollars of revenue in unexecuted stock transactions. Often, a failed or failing server component is the cause of the server failure. Examples of server components that may fail include hard drives, fans, and power supplies.

In the event of a system failure, the network monitors must dispatch a technician to the data center to find and replace the faulty component. Because the data center is used for a continuous or mission critical function, the technician must replace the faulty component as soon as possible. Each server typically includes several components that can be serviced by a user or technician. These components include fans, hard drives, motherboards, PCI cards, memory DIMMs, power supplies, cables, and CPUs, among other components. Each of these components may include one or more status lights that report the operational status of the component. A single component may include several status lights that report on the status of the device. The color of the status light, as well as whether the light is flashing or blinking, indicates whether the component is operating properly. For example, a green status light often indicates that the component is operating correctly. If the status light is a color other than green, or is flashing, then the device may be malfunctioning. Many components use a unique, if not complex, pattern of colored, blinking lights to communicate the status of the component.

As an example, a typical server hard drive contains several status lights. These hard drive status lights may correspond to power, disk activity, and an alarm indicator. Other server components may include more status lights than the typical hard drive. Because each server has several components, each server will have numerous status lights. For example, a typical server may contain eight hard drives, each of which includes three status lights. That same server may also include four power supplies, each containing three status lights. In addition, the server will typically include a dozen status lights on its front panel. This server will also typically include components that do not have status lights that are visible on the front panel. For example, the status lights for a fan unit are not visible until the chassis of server is opened. All told, a single server may include more than fifty individual status lights. A rack of servers may include hundreds of individual status lights, and a single aisle within a data center may include thousands of individual status lights.

What is needed is inexpensive and reliable visual indication of what equipment in an information handling system needs attention by a technician.

SUMMARY OF THE INVENTION

The present invention remedies the shortcomings of the prior art by providing a primary status indicator located on a visible front portion of equipment of an information handling system, e.g., bezel or panel of a server, workstation, disk storage array, etc. The primary status indicator may be controlled by to the server management software that is monitoring the server. If the server management software does not detect a failure or an imminent failure in any component of the equipment, then the primary status indicator will be illuminated to reflect a normal operating status. If the server management software does detect a failure or an imminent failure in a component of the equipment, then the primary status indicator will be illuminated to reflect an alert status.

In an exemplary embodiment of the present invention, the primary status indicator has two different areas on its face that may be contiguous or not. The two different frontal areas of the primary status indicator may be different colors, may be the same color or may be clear (transparent) wherein different colored light is coupled to the two different frontal areas. Two narrow band light filters, where each substantially only pass a specific wavelength (color) of light are located proximate to the respective ones of the two different frontal areas of the primary status indicator. The two narrow band light filters are arranged between a bi-color light source and the respective frontal areas such that each narrow band light filter will substantially reject or attenuate all light wavelengths except at its narrow band wavelength, e.g., 465 nanometers (blue) and 588 nanometers (amber). The bi-color light source produces a first color light when in a first state and a second color light when in a second state. These first and second light colors are at wavelengths that are compatible with the wavelength responses of the two narrow band light filters. The bi-color light source may be proximate to the light filters or optically coupled to the light filters through a light pipe, e.g., fiber optic cable, reflective hollow light tube, clear plastic or glass tube or rod, and the like.

Utilizing a single bi-color light source of the same colors as the primary status indictor allows easy recognition of equipment status even if the front panel or bezel of the equipment has been removed. There are cost and space savings on having to only use one light pipe and light source.

A technical advantage of the present invention is that only one bi-color light source, e.g., light emitting diode (LED), is required for status and alarm annunciation. Another technical advantage is that only a single light pipe is required (if used) for status and alarm annunciation. Another technical advantage is status may be determined from just the light source. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

Figure 1:
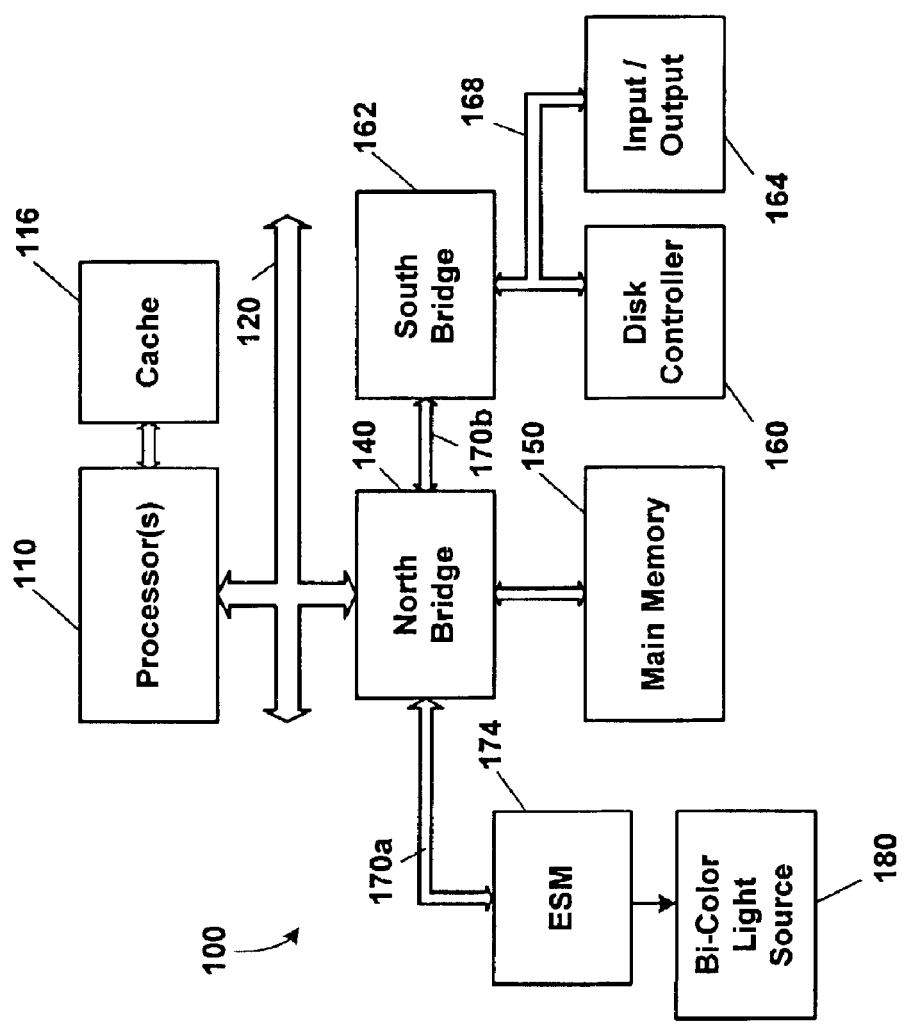
FIG. 1 is a schematic block diagram of an exemplary embodiment of equipment in an information handling system.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of an exemplary embodiments of the present invention are schematically illustrated. Like elements in the drawings will be represented by like numbers, and similar elements will be represented by like numbers with a different lower case letter suffix.

Referring to FIG. 1, an information handling system is illustrated having electronic components mounted on at least one printed circuit board (PCB) (motherboard) and communicating data and control signals therebetween over signal buses. In one embodiment, the information handling system is a computer system. The information handling system, generally referenced by the numeral 100, comprises a processor(s) 110 coupled to a host bus(es) 120 and a cache memory 116. A north bridge(s) 140, which may also be referred to as a memory controller hub or a memory controller, is coupled to a main system memory 150. The north bridge 140 is coupled to the system processor(s) 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI buses 170a and 170b, AGP bus coupled to graphics display (not shown), etc.

The second bus may also comprise other industry standard buses or proprietary buses, e.g., ISA, SCSI, USB buses 168 through a south bridge (bus interface) 162. These secondary buses 168 may have their own interfaces and controllers, e.g., ATA disk controller 160 and input/output interface(s) 164.

In the information handling system 100, according to the present invention, an interface 174 may be coupled to PCI bus 170a. The interface 174 is coupled to a bi-color light source 180, e.g., dual color (amber/blue) light emitting diode (LED). The light source 180 produces a first color light when in a first state, e.g., voltage at a first polarity, and a second color light when in a first state, e.g., voltage at a second (reverse) polarity. The bi-color light source 180 may be attached to the information handling system motherboard and project light in two different colors (one at a time) to a visual status indicator which indicates for example, equipment ok and equipment fault. The interface 174 may be part of an Embedded Server Management (ESM) input-output (I/O) interface.

Figure 2:
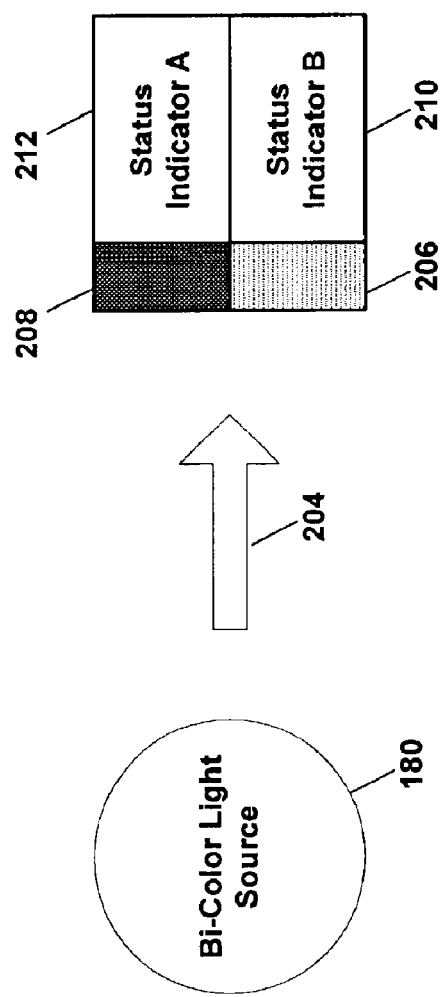
FIG. 2 is a schematic block diagram of an exemplary embodiment of the present invention.
Figure 4:
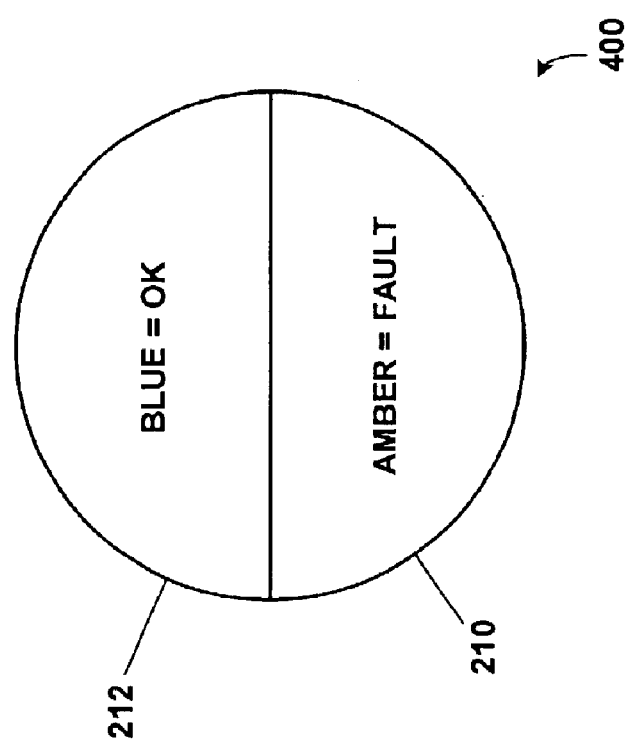
FIG. 4 is a schematic front view of the indicator illustrated in FIGS. 2 and 3.

Referring to FIG. 2, depicted is an exemplary embodiment of the present invention. The bi-color light source 180 illuminates 204 first bandpass light filter 206 and second bandpass light filter 208. The first and second light filters 206 and 208 are in light communication with first status indicator 210 and second status indicator 212, respectively. An exemplary embodiment of the face 400 of the first and second status indicators 210 and 212 is illustrated in FIG. 4. For illustrative purposes, a blue color light may represent system status OK and an amber color light may represent a system fault. Referring back to FIG. 2, light filter 208 may pass the blue wavelength of light (465 nanometers) and light filter 206 may pass the amber wavelength of light (588 nanometers). Since the filters 206 and 208 only pass a specific color of light, the indicators 210 and 212 may be clear, translucent, or matching colors. Suitable optical bandpass filters are manufactured by Thermo Corion, 8 East Forge Parkway, Franklin, Mass. 02038-3148.

Figure 3:
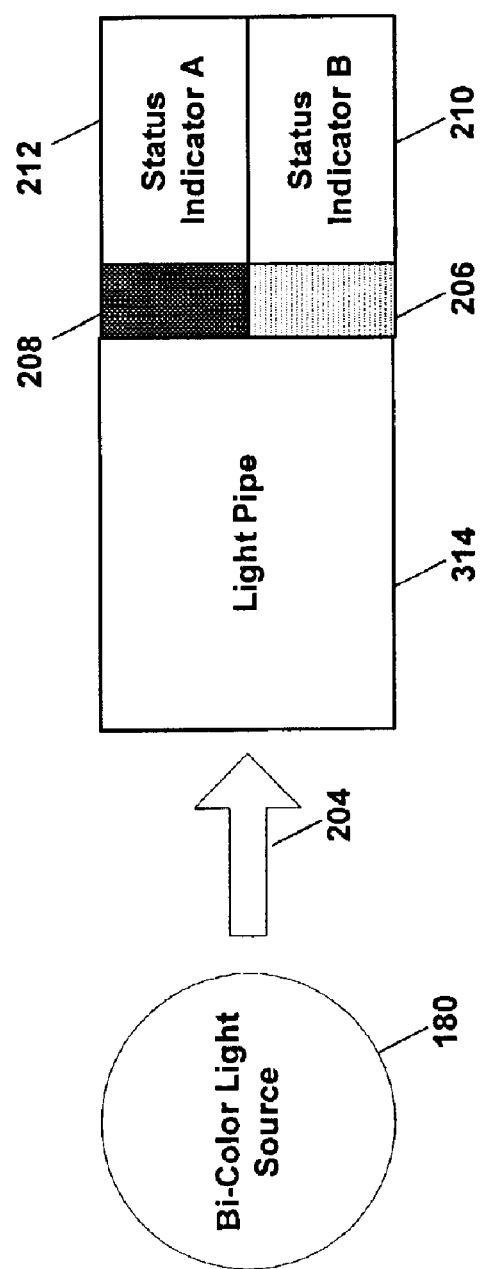
FIG. 3 is a schematic block diagram of another exemplary embodiment of the present invention.

Referring to FIG. 3, depicted is an exemplary embodiment of the present invention. A light pipe 314 optically couples the illumination 204 from the bi-color light source 180 to the first and second bandpass light filters 206 and 208. Using the light pipe 314 allows the bi-color light source 180 to be located away from the light filters 206, 208 and status indicators 210, 212. The light pipe may be any light conductive structure, e.g., fiber-optic bundle, hollow or clear inside reflective tube, clear plastic rod, etc.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having a bi-color light source for indicating status thereof, said system comprising:

a motherboard;

an interface attached to and in electrical communication with said motherboard;

a bi-color light source, said bi-color light source producing a first color light when in a first state and a second color light when in a second state;

a first bandpass light filter, said first bandpass light filter substantially passing the first color light and substantially rejecting all other colors of light;

a second bandpass light filter, said second bandpass light filter substantially passing the second color light and substantially rejecting all other colors of light; and a status indicator in light communication with said first and second bandpass light filters, wherein a first portion of said status indicator will be illuminated with the first color light and a second portion of said status indicator will be illuminated with the second color light.

2. The information handling system according to claim 1, wherein said bi-color light source is a bi-color light emitting diode.

3. The information handling system according to claim 1, wherein the first color light is blue.

4. The information handling system according to claim 1, wherein the second color light is amber.

5. The information handling system according to claim 1, further comprising a light pipe between said bi-color light source and said first and second bandpass light filters.

6. The information handling system according to claim 5, wherein said light pipe is a fiber optic cable.

7. The information handling system according to claim 5, wherein said light pipe is a light reflective hollow tube.

8. The information handling system according to claim 5, wherein said light pipe is a clear plastic tube.

9. The information handling system according to claim 5, wherein said light pipe is a clear glass tube.

10. The information handling system according to claim 1, wherein the first portion of said status indicator indicates a normal condition and the second portion of said status indicator indicates an abnormal condition.

11. The information handling system according to claim 1, wherein said status indicator is mounted on a front panel of an information handling system equipment.

12. The information handling system according to claim 11, wherein the front panel is removable so that said bi-color light source is visible when the front panel is removed.

13. The information handling system according to claim 1, wherein the first and second portions of said status indicator are contiguous on a face of said status indicator.

14. The information handling system according to claim 1, wherein said motherboard is a computer motherboard.

15. The information handling system according to claim 1, wherein the first state represents a system normal condition and the second state represents a system abnormal condition.

16. An apparatus for indicating status, comprising:

a bi-color light source, said bi-color light source producing a first color light when in a first state and a second color light when in a second state;

a first bandpass light filter, said first bandpass light filter substantially passing the first color light and substantially rejecting all other colors of light;

a second bandpass light filter, said second bandpass light filter substantially passing the second color light and substantially rejecting all other colors of light; and a status indicator in light communication with said first and second bandpass light filters, wherein a first portion of said status indicator will be illuminated with the first color light and a second portion of said status indicator will be illuminated with the second color light.

17. The apparatus according to claim 16, wherein said bi-color light source is a bi-color light emitting diode.

18. The apparatus according to claim 16, further comprising a light pipe between said bi-color light source and said first and second bandpass light filters.

19. The apparatus according to claim 16, wherein the first portion of said status indicator indicates a normal condition and the second portion of said status indicator indicates an abnormal condition.

20. The apparatus according to claim 16, wherein the first and second portions of said status indicator are contiguous on a face of said status indicator.

21. The apparatus according to claim 16, wherein the first state represents a normal condition and the second state represents an abnormal condition.

22. A method for indicating status, comprising the steps of:
   producing a first color light with a bi-color light source when the bi-color light source is in a first state;
   producing a second color light with the bi-color light source when the bi-color light source is in a second state;
   passing the first color light through a first bandpass light filter, the first bandpass light filter substantially rejecting all other colors of light;
   passing the second color light through a second bandpass light filter, the second bandpass light filter substantially rejecting all other colors of light; and
   illuminating a first portion of a status indicator with the first color light from the first bandpass light filter; and
   illuminating a second portion of the status indicator with the second color light from the second bandpass light filter.

23. The method according to claim 22, further comprising the step of conducting the first or second color lights with a light pipe between said bi-color light source and said first and second bandpass light filters.

24. The method according to claim 22, wherein the bi-color light source is a bi-color light emitting diode.

25. The method according to claim 22, wherein the first color light is blue.

26. The method according to claim 22, wherein the second color light is amber.

27. The method according to claim 22, wherein the first portion of the status indicator indicates a normal condition and the second portion of the status indicator indicates an abnormal condition.

* * * * *